(12) United States Patent
Hong et al.

(10) Patent No.: US 9,375,906 B2
(45) Date of Patent: Jun. 28, 2016

(54) METHOD FOR MANUFACTURING A FILM LAMINATE, AND FILM LAMINATE FORMED BY THE METHOD

(71) Applicants: Jin Ki Hong, Uiwang-si (KR); Seong Heun Cho, Uiwang-si (KR); Kyoung Ku Kang, Uiwang-si (KR); Hyoung Tae Im, Uiwang-si (KR); Jung Hyo Lee, Uiwang-si (KR); Si Kyun Park, Uiwang-si (KR); Se Hyun Park, Uiwang-si (KR)

(72) Inventors: Jin Ki Hong, Uiwang-si (KR); Seong Heun Cho, Uiwang-si (KR); Kyoung Ku Kang, Uiwang-si (KR); Hyoung Tae Im, Uiwang-si (KR); Jung Hyo Lee, Uiwang-si (KR); Si Kyun Park, Uiwang-si (KR); Se Hyun Park, Uiwang-si (KR)

(73) Assignee: CHEIL INDUSTRIES, INC., Gumi-si, Gyeongsangbuk-do (KR)

( * ) Notice: Subject to any disclaimer, the term of this patent is extended or adjusted under 35 U.S.C. 154(b) by 24 days.

(21) Appl. No.: 14/366,621

(22) PCT Filed: Dec. 20, 2012

(86) PCT No.: PCT/KR2012/011197
§ 371 (c)(1),
(2) Date: Jun. 18, 2014

(87) PCT Pub. No.: WO2013/095015
PCT Pub. Date: Jun. 27, 2013

(65) Prior Publication Data
US 2015/0004376 A1    Jan. 1, 2015

(30) Foreign Application Priority Data

Dec. 20, 2011  (KR) .................. 10-2011-0138669
Dec. 21, 2011  (KR) .................. 10-2011-0139590

(51) Int. Cl.
| | | |
|---|---|---|
| B32B 38/00 | (2006.01) |
| B32B 27/08 | (2006.01) |
| B32B 27/16 | (2006.01) |
| B32B 27/18 | (2006.01) |
| B32B 38/06 | (2006.01) |
| B29C 35/08 | (2006.01) |
| B29C 59/04 | (2006.01) |
| B32B 37/12 | (2006.01) |
| B32B 7/12 | (2006.01) |
| B32B 23/04 | (2006.01) |
| B32B 23/08 | (2006.01) |
| B32B 23/20 | (2006.01) |
| B32B 27/36 | (2006.01) |
| B32B 37/24 | (2006.01) |
| B05D 3/06 | (2006.01) |
| B05D 7/04 | (2006.01) |
| B05D 1/42 | (2006.01) |

(52) U.S. Cl.
CPC ......... *B32B 38/0008* (2013.01); *B29C 35/0888* (2013.01); *B29C 59/046* (2013.01); *B32B 7/12* (2013.01); *B32B 23/04* (2013.01); *B32B 23/08* (2013.01); *B32B 23/20* (2013.01); *B32B 27/08* (2013.01); *B32B 27/16* (2013.01); *B32B 27/18* (2013.01); *B32B 27/36* (2013.01); *B32B 37/12* (2013.01); *B32B 38/06* (2013.01); *B05D 1/42* (2013.01); *B05D 3/067* (2013.01); *B05D 7/04* (2013.01); *B29C 2035/0827* (2013.01); *B32B 2037/1253* (2013.01); *B32B 2037/243* (2013.01); *B32B 2038/0076* (2013.01); *B32B 2255/10* (2013.01); *B32B 2255/26* (2013.01); *B32B 2310/0831* (2013.01); *B32B 2333/12* (2013.01); *B32B 2367/00* (2013.01); *B32B 2375/00* (2013.01); *Y10T 428/24802* (2015.01); *Y10T 428/31551* (2015.04)

(58) Field of Classification Search
CPC .... B32B 38/0008; B32B 38/06; B32B 23/04; B32B 23/08; B32B 23/20; B32B 27/08; B32B 27/16; B32B 27/18; Y10T 428/24802; Y10T 428/31551
See application file for complete search history.

(56) References Cited

U.S. PATENT DOCUMENTS

2007/0253062 A1* 11/2007 Shimoda ............... G02B 1/111
359/580

FOREIGN PATENT DOCUMENTS

| CN | 101301806 A | 11/2008 |
|---|---|---|
| CN | 102197055 A | 9/2011 |
| JP | 2002-163931 A | 6/2002 |
| JP | 2006-154839 A | 6/2006 |
| JP | 2010-000742 A | 1/2010 |
| KR | 10-0744685 B1 | 7/2007 |
| KR | 10-2008-0062642 A | 7/2008 |
| KR | 10-2008-0099168 A | 11/2008 |
| WO | WO 9531737 A1 | 11/1995 |

OTHER PUBLICATIONS

Office Action mailed Feb. 16, 2015 in corresponding Chinese Patent Application No. 201280063256.6.
International Search Report Mailed Mar. 29, 2013 in PCT/KR2012/011197.

* cited by examiner

*Primary Examiner* — Betelhem Shewareged
(74) *Attorney, Agent, or Firm* — Lee & Morse, P.C.

(57) ABSTRACT

The present invention relates to a method for manufacturing a film laminate and to a film laminated formed by the method. The method comprises the steps of: applying a photocurable composition to a first base film; and irradiating light from a UV LED in order to harden the photocurable composition, wherein the first base film has a transmittance of approximately 50% or higher at the emission wavelength of the UV LED.

9 Claims, 3 Drawing Sheets

METHOD FOR MANUFACTURING A FILM LAMINATE, AND FILM LAMINATE FORMED BY THE METHOD

TECHNICAL FIELD

The present invention relates to a method for manufacturing a film laminate, and a film laminate formed by the method.

BACKGROUND ART

Since UV curing allows a resin to be cured at a faster rate than thermal curing, it is widely used in patterning and lamination of a base film. However, since a metal halide lamp or a high-pressure mercury lamp used in existing UV curing also emits light at wavelengths absorbed by the base film, these lamps can cause deterioration in degree of curing and generate large amounts of heat. As a result, the base film can suffer from deformation such as wrinkling and the like.

There is a method of increasing UV intensity to improve the degree of curing, adhesion, and pattern formation. However, this method can also cause deformation of the base film.

DISCLOSURE

Technical Problem

It is one aspect of the present invention to provide a method for manufacturing a film laminate, which can minimize external deformation of a base film in pattern formation or film lamination using UV curing.

It is another aspect of the present invention to provide a method for manufacturing a film laminate, which can prevent poor external appearance of a film laminate, such as wrinkling, by improving pattern formation or film lamination through improvement of the degree of curing even at low intensity of light.

It is a further aspect of the present invention to provide a method for manufacturing a film laminate, which enables eco-friendly fabrication of a film laminate using lower energy than that of an existing UV lamp.

It is yet another aspect of the present invention to provide a film laminate prepared by the method set forth above.

Technical Solution

In accordance with one aspect of the present invention, a method for manufacturing a film laminate may include: coating a photocurable composition onto a first base film; and curing the photocurable composition through irradiation using a UV LED, wherein the first base film may have a transmittance of about 50% or more at an emission wavelength of the UV LED.

In accordance with another aspect of the present invention, a film laminate may include: a base film having a transmittance of about 50% or more at an emission wavelength of a UV LED; and a coating layer formed on the base film and patterned by UV LED curing of a composition including a UV curable resin and a photoinitiator having a molar absorption coefficient of about 500 cm$^{-1}$mol$^{-1}$ or more at the emission wavelength of the UV LED, wherein the emission wavelength of the UV LED may be X nm±Y nm (where X is 365, 385, 400 or 415, and Y is in the range of 0≤Y≤10).

In accordance with a further aspect of the present invention, a film laminate may include a first base film, a UV curable adhesive layer and a second base film, wherein at least one of the first base film and the second base film may be a film having a transmittance of about 50% or more at an emission wavelength of a UV LED; the UV curable adhesive layer may be a cured adhesive layer of a composition for adhesive layers, which includes a UV curable resin, a monofunctional monomer or a polyfunctional monomer or a mixture thereof, and a photoinitiator having a molar absorption coefficient of about 500 cm$^{-1}$mol$^{-1}$ or more at the emission wavelength of the UV LED; and the emission wavelength of the UV LED may be X nm±Y nm (where X is 365, 385, 400 or 415, and Y is in the range of 0≤Y≤50).

Advantageous Effects

According to the present invention, in the preparation of a film laminate using UV curing, the film laminate can have a good external appearance by minimizing deformation of the base film and exhibit improved pattern formation and film lamination by improving the degree of curing even at low intensity of light.

BEST MODE

Figure 1:
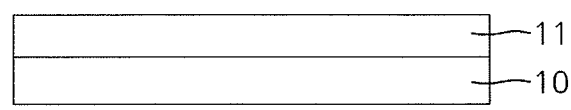
FIG. 1 is a flow diagram of a method for manufacturing a film laminate according to one embodiment of the present invention.
Figure 1:
Figure 1:
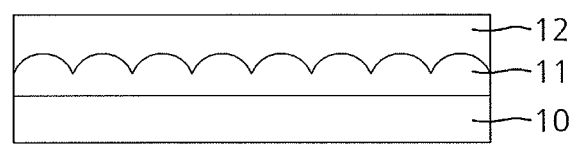
Figure 1:
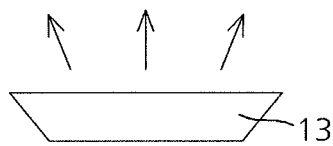
Figure 1:
Figure 1:
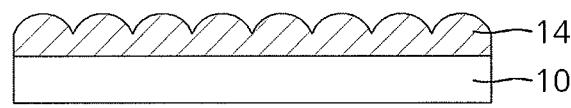

In accordance with one aspect of the present invention, a method for manufacturing a film laminate may include: coating a photocurable composition onto a first base film; and curing the photocurable composition through irradiation using a UV LED, wherein the first base film may have a transmittance of about 50% or more at an emission wavelength of the UV LED.

The first base film may be a UV cut film. In one embodiment, the first base film has a transmittance of about 50% or more, preferably about 80% or more at the emission wavelength of the UV LED. Damage to the first base film having the aforementioned transmittance can be minimized by irradiation using the UV LED for curing the photocurable composition, and the photocurable composition can be cured even at low UV intensity. More preferably, the first base film has a transmittance from about 50% to about 80%.

Existing metal halide lamps and high-pressure mercury lamps emit UV light in a wide range of wavelengths. As a result, some of the UV light emitted therefrom can be absorbed by the base film and thus the radiant exposure of UV irradiation must be increased for curing of the photocurable composition. Increase in the radiant exposure of UV irradiation can cause damage and deformation of the base film.

According to the invention, the base film having specific transmittance at the emission wavelength of the UV LED is used, thereby improving the degree of curing the photocurable composition while minimizing damage to the base film.

Transmittance of the base film may be measured using an integrating sphere measurement instrument, without being limited thereto.

The emission wavelength of the UV LED may be X nm±Y nm (where X is 365, 385, 400 or 415, and Y is in the range of 0≤Y≤10), without being limited thereto. For example, the emission wavelength of the UV LED is from about 350 nm to about 450 nm, preferably from about 365 nm to about 415 nm, more preferably about 365 nm, about 385 nm, about 400 nm, or about 415 nm.

The first base film may have a thickness from about 10 μm to about 100 μm, without being limited thereto.

The first base film has a glass transition temperature (Tg) of less than 200° C., preferably from about 50° C. to about 150° C.

The first base film may be a triacetyl cellulose (TAC) or polyethylene terephthalate (PET) film, without being limited thereto.

According to the invention, the film laminate may include a laminate including a base film; and a coating layer formed on the base film, particularly, a patterned coating layer formed on the base film.

In addition, according to the invention, the film laminate may include any laminate in which the base films are laminated via an adhesive layer.

The photocurable composition may form the coating layer or the adhesive layer.

In one embodiment, the photocurable composition may be a composition for coating layers.

In one embodiment, the coating layer with a pattern may be formed by exposing the photocurable composition to the UV LED using a patterning method.

That is, the method for manufacturing a film laminate may include: coating the composition for coating layers onto the base film having a transmittance of about 50% or more at the emission wavelength of the UV LED; and forming a pattern on the coating layer by exposing the composition for coating layers to the UV LED using a patterning method. The method for manufacturing a film laminate can provide a film laminate that includes the base film; and the patterned coating layer formed on the base film.

FIG. 1 is a flow diagram of a method for forming a pattern on a coating layer according to one embodiment of the present invention.

Referring to FIG. 1, a composition 11 for coating layers is coated onto a base film 10. Next, a pattern formation member 12 (for example, a mold for pattern formation) is placed on the composition 11 for coating layers. Next, the composition 11 is irradiated with UV LED emitted from a UV LED source 13, followed by removal of the pattern formation member 12, thereby obtaining a coating layer 14 which has a pattern formed thereon and is stacked on the base film 10.

The composition for coating layers may include a UV curable resin and a photoinitiator.

The UV curable resin may include resins containing (meth)acrylate functional group, for example, urethane resin, ester resin, acrylic resin, alkyd resin, spiroacetal resin, polybutadiene resin, polythiolpolyene resin, and (meth)acrylate resin of polyfunctional compounds including polyhydric alcohols, without being limited thereto.

Examples of the UV curable resin may include urethane (meth)acrylate, ethyleneglycol di(meth)acrylate, neopentylglycol di(meth)acrylate, 1,6-hexanediol(meth)acrylate, trimethylolpropane tri(meth)acrylate, dipentaerythritol hexa (meth)acrylate, polyolpoly(meth)acrylate, di(meth)acrylate of bisphenol A-diglycidylether, polyester(meth)acrylates which can be obtained by esterification of a polyhydric alcohol, a multivalent carboxylic acid and an acrylic acid, polysiloxane poly(meth)acrylate, pentaerythritol tetra(meth)acrylate, and glycerin tri(meth)acrylate, without being limited thereto. These may be used alone or in combination thereof.

The UV curable resin may include a hyperbranched polyester (meth)acrylate oligomer having a hyperbranch structure. In one embodiment, the hyperbranched polyester(meth)acrylate oligomer may have about 15 to about 100 acrylate functional groups.

The hyperbranched polyester(meth)acrylate oligomer has a three-dimensional structure, and exhibits low viscosity, fast curing rate, scratch resistance and chemical resistance.

The hyperbranched polyester(meth)acrylate oligomer may be commercially available. For example, the hyperbranched polyester(meth)acrylate oligomer may be CN2304 prepared in Sartomer, without being limited thereto.

In one embodiment, the UV curable resin may be a mixture of the hyperbranched polyester(meth)acrylate oligomer and a urethane(meth)acrylate resin. In the mixture, a weight ratio of the hyperbranched polyester(meth)acrylate oligomer:the urethane(meth)acrylate resin ranges from about 1:1 to about 3:1, preferably from about 1.1:1 to about 1.6:1, more preferably from about 1.2:1 to 1.5:1.

The UV curable resin may include about 30 parts by weight to about 70 parts by weight of the hyperbranched polyester (meth)acrylate oligomer, and about 30 parts by weight to about 70 parts by weight of the urethane(meth)acrylate resin, based on 100 parts by weight of the UV curable resin. Preferably, the UV curable resin includes about 50 parts by weight to about 70 parts by weight of the hyperbranched polyester (meth)acrylate oligomer, and about 30 parts by weight to about 50 parts by weight of the urethane(meth)acrylate resin.

The photoinitiator may include an initiator having a maximum molar absorption coefficient at the emission wavelength of the UV LED. As a result, since low-heat emission/high-efficiency curing reaction occurs even given a low radiant exposure of irradiation, the film laminate can be prepared without deformation of the base film.

In one embodiment, the photoinitiator may have a molar absorption coefficient of about 500 $cm^{-1}mol^{-1}$ or more at the emission wavelength of the UV LED. Preferably, the photoinitiator has a molar absorption coefficient from about 500 $cm^{-1}mol^{-1}$ to about 2000 $cm^{-1}mol^{-1}$.

Examples of the photoinitiator may include at least one selected from the group consisting of monoacyl phosphine oxide, bisacyl phosphine oxide, metallocene, α-hydroxyketone, phenyl glyoxylate, and α-aminoketone initiators, without being limited thereto.

The photoinitiator is present in an amount of about 0.01 parts by weight to about 10 parts by weight, preferably about 1 part by weight to about 5 parts by weight based on 100 pats by weight of the UV curable resin.

The composition for coating layers may further include a release agent to separate the pattern formation member from the coating layer during patterning.

The release agent may include a polyether-modified silicone release agent and a fluorine release agent, without being limited thereto.

The release agent is present in an amount of about 0.01 parts by weight to about 5 parts by weight, preferably about 0.01 parts by weight to about 1 part by weight based on 100 pats by weight of a sum of the UV curable resin and the photoinitiator.

In the method for manufacturing a film laminate, the composition for coating layers is coated onto the base film, followed by exposing the composition to the UV LED using a pattering method, thereby forming a pattern simultaneously with curing of the composition for coating layers.

The emission wavelength of the UV LED may be X nm±Y nm (where X is 365, 385, 400 or 415, and Y is in the range of $0 \leq Y \leq 10$), without being limited thereto. Preferably, the emission wavelength of the UV LED is from about 350 nm to about 450 nm.

The "exposing the composition using a patterning method" may include a typically known pattern formation method for formation of a pattern on a coating layer. The pattern formation method may include a method, in which a pattern formation member (for example, a mold for pattern formation) having a predetermined pattern thereon is brought into contact with the composition for coating layers, followed by curing the composition through irradiation using a UV LED, and is removed from the composition, without being limited thereto.

The UV LED may be irradiated to the composition for coating layers through the base film to perform patterning and curing of the composition for coating layers, without being limited thereto.

UV LED may be irradiated at a radiant exposure from about 100 mJ/cm² to about 500 mJ/cm² and at a speed from 1 mpm to about 20 mpm, without being limited thereto.

In another embodiment, the photocurable composition may be a composition for adhesive layers. That is, the composition for adhesive layers is interposed between base films, followed by curing the composition for adhesive layers, thereby achieving lamination of the base films.

Specifically, the method for manufacturing a film laminate may include: coating the composition for adhesive layers onto a first base film; laminating a second base film on the composition for adhesive layers; and curing the composition for adhesive layers through irradiation using a UV LED. With this method, a film laminate in which the first base and second base film are laminated can be prepared.

Figure 2:
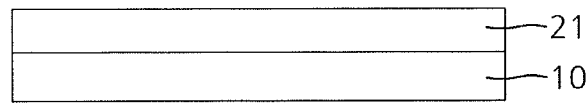
FIG. 2 is a flow diagram of a film lamination method according to one embodiment of the present invention.
Figure 2:
Figure 2:
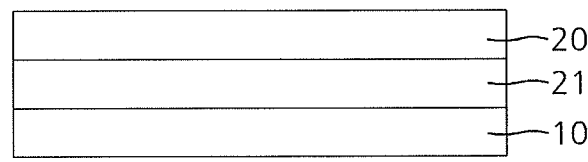
Figure 2:
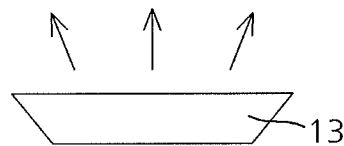
Figure 2:
Figure 2:
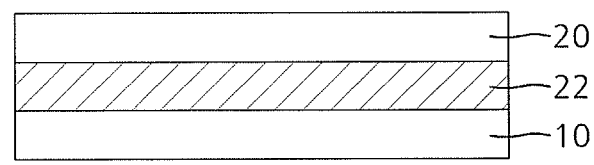

FIG. 2 is a flow diagram of a film lamination method according to one embodiment of the present invention.

Referring to FIG. 2, a composition 21 for adhesive layers is coated onto a first base film 10, followed by laminating a second base film 20 on the composition 21. Next, the composition 21 is irradiated with UV LED emitted from a UV LED source 13, thereby achieving lamination of the first base film 10 and the second base films 20 via a cured adhesive layer 22.

An emission wavelength of the UV LED passes through typical base films, thereby improving adhesion between the base films.

Since UV light emitted from an existing metal halide lamp or high-pressure mercury lamp is also absorbed by the base film due to a wide range of wavelengths thereof, the radiant exposure of UV irradiation must be increased. When the radiant exposure of UV irradiation is increased, the base film can suffer from damage and external deformation.

According to the present invention, a specific kind of base film is used at the emission wavelength of the UV LED, thereby improving adhesion between the base films while minimizing external deformation of the base films.

The emission wavelength of the UV LED may be X nm±Y nm (where X is 365, 385, 400 or 415, and Y is in the range of $0 \leq Y \leq 50$), without being limited thereto.

For example, the emission wavelength of the UV LED is from about 350 nm to about 450 nm, preferably from about 365 nm to about 415 nm, more preferably about 365 nm, about 385 nm, about 400 nm, or about 415 nm.

At least one of the first base film and the second base film has a transmittance of about 50% or more, preferably from about 60% to about 95% at the emission wavelength of the UV LED. In one embodiment, the first base film and the second base film may be selected from the group consisting of cellulose including triacetyl cellulose (TAC), polyester including polyethylene terephthalate (PET), polyacrylic, polyepoxy, polyethylene, polypropylene, and polystyrene polymer films. Preferably, the first base film and the second base film are triacetyl cellulose or polyethylene terephthalate films.

At least one of the first base film and the second base film has a glass transition temperature (Tg) of less than about 200° C., preferably from about 50° C. to 150° C.

The first base film and the second base film have a thickness from about 10 μm to about 500 μm, preferably from about 10 μm to about 200 μm, more preferably from about 50 μm to about 100 μm.

The composition for adhesive layers may include: a UV curable resin; a monofunctional or a polyfunctional monomer or a mixture thereof; and a photoinitiator.

The UV curable resin may include resins containing (meth) acrylate functional group, for example, urethane, ester, polyester, ether, acrylic, alkyd, spiroacetal, polybutadiene, polythiolpolyene resins, and (meth)acrylate oligomers of polyfunctional compounds including polyhydric alcohols, without being limited thereto.

Examples of the UV curable resin may include urethane (meth)acrylate, ethyleneglycol di(meth)acrylate, neopentylglycol di(meth)acrylate, 1,6-hexanediol(meth)acrylate, trimethylolpropane tri(meth)acrylate, dipentaerythritol hexa(meth)acrylate, polyol poly(meth)acrylate, di(meth)acrylate of bisphenol A-diglycidylether, polyester(meth)acrylate which can be obtained by esterification of a polyhydric alcohol, a multivalent carboxylic acid and a (meth)acrylic acid, polysiloxane poly(meth)acrylate, pentaerythritol tetra(meth)acrylate, and glycerin tri(meth)acrylate oligomers, without being limited thereto. These may be used alone or in combination thereof. Preferably, the UV curable resin is a polyester urethane(meth)acrylate oligomer (molecular weight from about 1,000 g/mol to about 3,000 g/mol).

The monofunctional monomer or polyfunctional monomer may have a molecular weight (Mw) from about 150 g/mol to about 350 g/mol.

The monofunctional monomer may include at least one selected from the group consisting of (meth)acrylate monomers and fluorine-modified (meth)acrylate monomers.

For example, the monofunctional monomer may include at least one selected from the group consisting of (meth)acrylate monomers containing $C_2$ to $C_{20}$ alkyl group having a hydroxyl group, (meth)acrylate monomers containing $C_1$ to $C_{20}$ alkyl group, (meth)acrylate monomers containing tetrahydrofurfural group, (meth)acrylate monomers containing $C_5$ to $C_{20}$ alicyclic group, (meth)acrylate monomers containing $C_5$ to $C_{20}$ heteroalicyclic group having at least one heteroatom selected from among nitrogen, sulfur and oxygen atoms, (meth)acrylate monomers containing carboxylic acid group, and fluorine modified (meth)acrylate monomers.

The fluorine modified (meth)acrylate monomer may include a monomer obtained by substituting a hydrogen atom of the (meth)acrylate monomer with a fluorine.

The polyfunctional monomer is a bi- or high functional monomer, or a tri-or high functional monomer, preferably a hexa- or high functional monomer. For example, the polyfunctional monomer may include at least one selected from the group consisting of polyfunctional (meth)acrylate monomers and fluorine modified polyfunctional (meth)acrylate monomers.

Examples of the monofunctional monomer or polyfunctional monomer may include (meth)acrylates containing tetrahydrofurfuryl group, (meth)acrylic acid esters containing $C_2$ to $C_{20}$ alkyl group having a hydroxyl group, and mixtures thereof.

Specifically, the monomer may include at least one selected from the group consisting of a monofunctional or polyfunctional (meth)acrylate monomer, which is selected from the group consisting of tetrahydrofurfuryl(meth)acrylate, 1,6-hexanediol di(meth)acrylate, ethyleneglycol di(meth)acrylate, diethyleneglycol di(meth)acrylate, triethyleneglycol di(meth)acrylate, 1,4-butanediol di(meth)acrylate, neopentylglycol di(meth)acrylate, pentaerythritol di(meth)acrylate, pentaerythritol tri(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A di(meth)acrylate, trimethylolpropane tri(meth)acrylate, ditrimethylolpropane penta(meth)acrylate, ditrimethylolpropane hexa(meth)acrylate, novolacepoxy(meth)acrylate and propyleneglycol di(meth)acrylate, and a fluorine modified monofunctional or polyfunctional (meth)acrylate monomer obtained by fluorine modification of the monofunctional or polyfunctional (meth)acrylate monomer.

The monomer includes the monofunctional or polyfunctional monomer alone, preferably a mixture thereof. In the mixture, a weight ratio of the monofunctional monomer:the polyfunctional monomer is from about 1:0.1 to about 1:2, preferably from about 1:0.5 to about 1:1, more preferably from about 1:0.7 to about 1:0.9.

The photoinitiator may have a molar absorption coefficient of about 500 $cm^{-1}mol^{-1}$ or more at the emission wavelength of the UV LED. Preferably, the photoinitiator has a molar absorption coefficient from about 500 $cm^{-1}mol^{-1}$ to about 2000 $cm^{-1}mol^{-1}$.

Examples of the photoinitiator may include at least one selected from the group consisting of thioxanthone, monoacyl phosphine oxide, bisacyl phosphine oxide, metallocene, α-hydroxyketone, phenyl glyoxylate, and α-aminoketone initiators, without being limited thereto. Preferably, the photoinitiator is a thioxanthone initiator.

The composition for adhesive layers may include: about 10 parts by weight to about 60 parts by weight of the UV curable resin; about 30 parts by weight to about 80 parts by weight of the monofunctional or polyfunctional monomer or the mixture thereof; and about 1 part by weight to about 10 parts by weight of the photoinitiator, based on 100 parts by weight of the composition for adhesive layers.

Preferably, the composition for adhesive layers includes: about 20 parts by weight to about 40 parts by weight of the UV curable resin; about 50 parts by weight to about 70 parts by weight of the monofunctional or polyfunctional monomer or the mixture thereof; and about 1 part by weight to about 10 parts by weight of the photoinitiator, based on 100 parts by weight of the composition for adhesive layers.

A direction in which irradiation using a UV LED is performed is not limited. In one embodiment, the UV LED may be irradiated to the composition for adhesive layers through the first base film or the second base film to perform curing of the composition for adhesive layers.

UV LED irradiation may be performed at a radiant exposure from about 100 $mJ/cm^2$ to about 500 $mJ/cm^2$ and at a speed from 1 mpm to about 20 mpm, without being limited thereto.

In accordance with another aspect of the present invention, a film laminate may be prepared by the method as set forth above.

Figure 3:
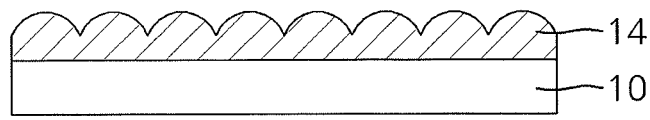
FIG. 3 is a cross-sectional view of a film laminate including a patterned coating layer according to one embodiment of the present invention.

In one embodiment, as shown in FIG. 3, the film laminate may include: a first base film 10; and a patterned coating layer 14 laminated on the first base film 10. Specifically, the film laminate may include: a first base film having a transmittance of about 50% or more at an emission wavelength of a UV LED; and a coating layer which is formed on the first base film and patterned by UV curing of a composition including a UV curable resin and a photoinitiator having a molar absorption coefficient of about 500 $cm^{-1}mol^{-1}$ or more at the emission wavelength of the UV LED.

The film laminate may be prepared by the pattern formation method of the coating layer.

Details of the emission wavelength of the UV LED, the base film, the UV curable resin and the photoinitiator are as described above.

The film laminate, which is a film including the patterned coating layer, is a functional film, and may be used for film lamination, or may be used as a shape transfer film, an inorganic particle-containing film, and the like, without being limited thereto.

Figure 4:
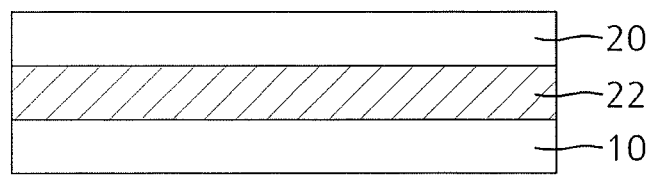
FIG. 4 is a cross-sectional view of a film laminate according to one embodiment of the present invention.

In another embodiment, as shown in FIG. 4, the film laminate may include: a first base film 10; an adhesive layer 22 laminated on the first base film 10; and a second base film 20 formed on the adhesive layer 22. Specifically, the film laminate may be prepared by lamination of these films. The film laminate may include a first base film, a UV curable adhesive layer, and a second base film, wherein the first base film or the second base film may have a transmittance of about 50% or more at an emission wavelength of a UV LED; the UV curable adhesive layer may be a cured adhesive layer of a composition including a UV curable resin, a monofunctional or polyfunctional monomer or a mixture thereof, and a photoinitiator; and the emission wavelength of the UV LED may be X nm±Y nm (where X is 365, 385, 400 or 415, and Y is in the range of 0≤Y≤50).

Details of the first and second base films, the UV curable resin, the monofunctional or polyfunctional monomer or the mixture thereof, the photoinitiator, and the emission wavelength of the UV LED are as described above.

[Mode For Invention]

Hereinafter, the present invention will be described in more detail with reference to some examples. However, it should be understood that these examples are provided for illustration only and are not to be construed in any way as limiting the present invention.

(1) Details of components used in Example 1 and Comparative Examples 1 to 3 are as follows.

1. As a UV curable resin, a hyperbranched polyester acrylate oligomer (CN2304 prepared in Sartomer) and a urethane acrylate resin (RC28-724 prepared in DIC CORPORATION) were used.

2. As a photoinitiator, phosphine oxide, TPO (diphenyl 2,4,5-trimethylbenzoyl-phosphine oxide) was used.

3. As a base film, a triacetyl cellulose (TAC) film (Hyosung Co., Ltd., thickness: 80 μm, glass transition temperature: 120° C.) having a transmittance of 50% or more at a wavelength of 365 nm and a transmittance of 80% or more at a wavelength of 415 nm was used.

4. As a release agent, BYK333 (BYK chemie Co., Ltd.) was used.

5. As a base film, a cycloolefin polymer (COP) film (thickness: 80 μm, glass transition temperature: 150° C.) and a polycarbonate (PC) film (thickness: 80 μm, glass transition temperature: 120° C.) having a transmittance of less than 50% at a wavelength of 365 nm were used.

(2) Details of components used in Examples 2 to 3 and Comparative Examples 4 to 5 are as follows.

1. As a UV curable resin, a polyester urethane acrylate oligomer (UX-4101, Nippon Kayaku Co., Ltd.) was used.

2. As a polyfunctional monomer, 1,6-hexanediol diacrylate (HDDA, Nippon Kayaku Co., Ltd.) was used. In addition, as a monofunctional monomer, tetrahydrofurfuryl acrylate (TC-101, Nippon Kayaku Co., Ltd.) was used.

3. As a photoinitiator, 2,4-diethyl thioxanthone (DETX, Nippon Kayaku Co., Ltd., maximum absorption wavelength λmax: 360 nm) was used.

4. As a base film, a triacetyl cellulose (TAC) film (Hoysung Co., Ltd., thickness: 80 μm, glass transition temperature: 120° C.) and a polyethylene terephthalate (PET) film (Toyobo Co., Ltd., thickness: 100 μm, glass transition temperature: 69° C.), which had a transmittance of 50% or more at a wavelength of 365 nm and a transmittance of 80% or more at a wavelength of 415 nm, were used.

5. As a base film, a polymethylmethacrylate (PMMA) film (I-components Co., Ltd., thickness: 100 μm, glass transition temperature: 105° C.) having a transmittance of less than 50% at 365 nm was used.

Example 1

60 parts by weight of a hyperbranched polyester acrylate oligomer and 40 parts by weight of a urethane acrylate resin were mixed, followed by stirring for 30 minutes. 5 parts by weight of a photoinitiator was introduced into the mixture. Next, based on 100 parts by weight of the hyperbranched polyester acrylate oligomer, the urethane acrylate resin and the photoinitiator, 1 part by weight of a release agent was introduced into the mixture, followed by final stirring for 30 minutes, thereby preparing a composition for coating layers. The prepared composition was coated onto a TAC base film using a wired bar coater No. 7. A specific-shape pattern mold was placed on the composition for coating layers, followed by curing at a radiant exposure of 200 mJ/cm$^2$ and at a speed of 10 mpm using a UV LED having an emission wavelength of 365 nm, and then removed from the composition, thereby forming a pattern on a coating layer.

Example 2

30 parts by weight of a UV curable resin, 30 parts by weight of 1,6-hexanediol diacrylate, and 35 parts by weight of tetrahydrofurfuryl acrylate were mixed, followed by stirring at 60° C. for 1 hour. 5 parts by weight of a photoinitiator was added to the mixture, followed by additional stirring for 30 minutes, thereby preparing a composition for adhesive layers. The prepared composition for adhesive layers was coated to a thickness of 10 μm onto a triacetyl cellulose film corresponding to a first base film. A triacetyl cellulose film corresponding to a second base film was brought into contact with the coated composition for adhesive layers. For film lamination, the composition for adhesive layers was cured by UV irradiation at a radiant exposure of 300 mJ/cm$^2$ using a UV LED (emission wavelength: 365 nm).

Example 3

Film lamination was performed in the same manner as in Example 2 except that a polyethylene terephthalate film was used instead of the triacetyl cellulose film corresponding to the second base film.

Comparative Examples 1 to 2

A pattern was formed on a coating layer in the same manner as in Example 1 except that a cycloolefin polymer (COP) film (Comparative Example 1) or a polycarbonate (PC) film (Comparative Example 2) was used instead of the TAC base film.

Comparative Example 3

A pattern was formed on a coating layer in the same manner as in Example 1 except that a metal halide lamp was used instead of the UV LED.

Comparative Example 4

Film lamination was performed in the same manner as in Example 2 except that a metal halide lamp was used instead of the UV LED.

Comparative Example 5

Film lamination was performed in the same manner as in Example 2 except that a polymethylmethacrylate film was used instead of the triacetyl cellulose films corresponding to the first and second base films.

The films prepared in Example 1 and Comparative Examples 1 to 3 were evaluated as to pattern formation, external deformation of the base film, and the degree of curing of the coating layer. Results are shown in Table 1.

Property Evaluation (1) Pattern formation: When external appearance of the coating layer was observed with the naked eye, a coating layer having a good pattern was rated as O and a coating layer having a poor pattern was rated as X.

(2) External deformation of base film: When external appearance of the base film was observed with the naked eye, a base film suffering from wrinkling was rated as O, and a base film not suffering from wrinkling was rated as X.

(3) Degree of curing of coating layer: To evaluate the degree of curing of the coating layer, pencil hardness was measured (JIS 5600, velocity: 0.5 mm/s, scale: 10 mm, load: 750 g). When measurement was performed on the coating layer having a thickness from 6 μm to 7 μm, a coating layer having a pencil hardness of 2H or higher was rated as O, a coating layer having a pencil hardness of higher than HB and H or lower was rated as Δ, and a coating layer having a pencil hardness of HB or lower was rated as X.

TABLE 1

|  | Pattern formation | External deformation of base film | Degree of curing of coating layer |
| --- | --- | --- | --- |
| Example 1 | O | X | O |
| Comparative Example 1 | X | X | X |
| Comparative Example 2 | X | X | Δ |
| Comparative Example 3 | X | O | X |

As shown in Table 1, in the method for manufacturing a film laminate according to the invention, when the base film having a transmittance of 50% or more at the emission wavelength of the UV LED was subjected to UV irradiation, a pattern could be formed without external deformation of the base film while improving pattern formation and the degree of curing of the coating layer.

The film laminates prepared in Examples 2 to 3 and Comparative Examples 4 to 5 were evaluated as to external deformation of the base film and adhesion between the base films. Results are shown in Table 2.

Property Evaluation (1) External deformation of base film: When external appearance of the base film was observed with the naked eye, a base film suffering from wrinkling was rated as O, and a base film not suffering from wrinkling was rated as X.

(2) Adhesion: Adhesion was measure in accordance with JIS K 6852 (test method for shear strength of adhesive bonds by compression). The film laminate having an adhesive strength between the base films of 1000 kgf/mm$^2$ or more was rated as O, the film laminate having an adhesive strength between the base films of 500 kgf/mm$^2$ or more and less than 1000 kgf/mm$^2$ was rated as Δ, and the film laminate having an adhesive strength between the base films of less than 500 kgf/mm$^2$ was rated as X.

TABLE 2

| | External deformation of base film | Adhesion |
|---|---|---|
| Example 2 | X | ○ |
| Example 3 | X | ○ |
| Comparative Example 4 | ○ | X |
| Comparative Example 5 | ○ | X |

As shown in Table 2, in the method for manufacturing a film laminate of the invention, when the specific base film was subjected to UV irradiation at the emission wavelength of the UV LED, film lamination could be improved due to improvement of adhesion between the base films, and the base film did not suffer from external deformation.

Although the present invention has been described with reference to some embodiments, it should be understood that the present invention may be embodied in different ways, and that various modifications, changes, alterations, and equivalent embodiments can be made by those skilled in the art without departing from the spirit and scope of the present invention. Therefore, the scope of the invention should be limited only by the accompanying claims.

The invention claimed is:

1. A film laminate comprising:
a base film having a transmittance of about 50% or more at an emission wavelength of a UV LED; and
a patterned coating layer formed on the base film and formed by UV LED curing of a composition including a UV curable resin and a photoinitiator having a molar absorption coefficient of about 500 cm$^{-1}$mol$^{-1}$ or more at the emission wavelength of the UV LED,
wherein the emission wavelength of the UV LED is X nm±Y nm, where X is 365, 385, 400 or 415, and Y is in the range of 0≤Y≤10.

2. The film laminate according to claim 1, wherein the base film is a triacetyl cellulose (TAC) or polyethylene terephthalate (PET) film.

3. The film laminate according to claim 1, wherein the photoinitiator comprises at least one selected from the group consisting of monoacyl phosphine oxide, bisacyl phosphine oxide, metallocene, α-hydroxyketone, phenyl glyoxylate, and α-aminoketone initiators.

4. The film laminate according to claim 1, wherein the UV curable resin comprises a hyperbranched polyester (meth)acrylate oligomer.

5. The film laminate according to claim 1, wherein the UV curable resin further comprises a urethane (meth)acrylate resin, and comprises about 30 parts by weight to about 70 parts by weight of the hyperbranched polyester (meth)acrylate oligomer and about 30 parts by weight to about 70 parts by weight of the urethane (meth)acrylate resin, based on 100 parts by weight of the UV curable resin.

6. A film laminate comprising a first base film, an adhesive layer, and a second base film,
wherein at least one of the first base film and the second base film has a transmittance of about 50% or more at an emission wavelength of a UV LED;
the adhesive layer is a cured product of a composition for an adhesive layer comprising a UV curable resin, a monofunctional monomer or polyfunctional monomer or a mixture thereof, and a photoinitiator having a molar absorption coefficient of about 500 cm$^{-1}$mol$^{-1}$ or more at the emission wavelength of the UV LED; and
the emission wavelength of the UV LED is X nm±Y nm, where X is 365, 385, 400 or 415, and Y is in the range of 0≤Y≤10.

7. The film laminate according to claim 6, wherein the composition for an adhesive layer comprises: about 10 parts by weight to about 60 parts by weight of the UV curable resin; about 30 parts by weight to about 80 parts by weight of the monofunctional monomer or polyfunctional monomer or the mixture thereof; and about 1 part by weight to about 10 parts by weight of the photoinitiator, based on 100 parts by weight of the composition for adhesive layers.

8. The film laminate according to claim 6, wherein the UV curable resin is a urethane (meth)acrylate resin.

9. The film laminate according to claim 6, wherein the photoinitiator comprises at least one selected from the group consisting of thioxanthone, monoacyl phosphine oxide, bisacyl phosphine oxide, metallocene, α-hydroxyketone, phenyl glyoxylate, and α-aminoketone initiators.

* * * * *